United States Patent [19]
Wehrman

[11] 3,822,535
[45] July 9, 1974

[54] POWERED LAWN RAKER
[76] Inventor: Roger Wehrman, Sheboygan, Wis.
[22] Filed: Jan. 11, 1973
[21] Appl. No.: 322,752

[52] U.S. Cl. .............................................. 56/16.4
[51] Int. Cl. ............................................ A01d 51/00
[58] Field of Search .......... 56/16.1, 13.4, 16.4, 400, 56/400.21, 364; 172/45

[56] References Cited
UNITED STATES PATENTS
2,585,296  2/1952  Bennett et al. ...................... 172/45
3,125,844  3/1964  Beyer ................................. 56/16.4
3,512,345  5/1970  Smith ................................. 56/16.9
3,545,187  12/1970  Whitney ........................... 56/16.1 X Primary Examiner—Russell R. Kinsey

[57] ABSTRACT

A powered, towable lawn rake having a rigid frame, a rake and drive means on said frame with the drive to said shaft being through a series of belts and pulleys. Mounted on said rake shaft are a multiplicity of torsionally wound coil springs, the ends of said springs being raking fingers to agitate and loosen dead grass and other matter from lawn.

4 Claims, 4 Drawing Figures

PATENTED JUL 9 1974　　　　　　　　　　　3,822,535

POWERED LAWN RAKER

BACKGROUND OF THE INVENTION

1. FIELD OF INVENTION

This invention relates to a powered, towable lawn rake, to be towed behind lawnmower or other towing means, to agitate and loosen dead grass and other matter from lawns, thereby keeping grass clean and healthy.

2. DESCRIPTION OF PRIOR ART

Prior art shows implements similar in nature to my invention, however they are very complex with innumerable moving parts. My invention is simple in design, with easy to replace raking fingers.

SUMMARY OF THE INVENTION

It is the primary object of this invention to provide an easy to use and to maintain, powered lawn rake which will agitate and loosen dead grass and other matter from lawns, efficiently and with a minimum of effort on the users' part, as it is towed behind a lawnmower or other vehicle.

DESCRIPTION OF THE PREFERRED EMBODIMENT

Figure 1:
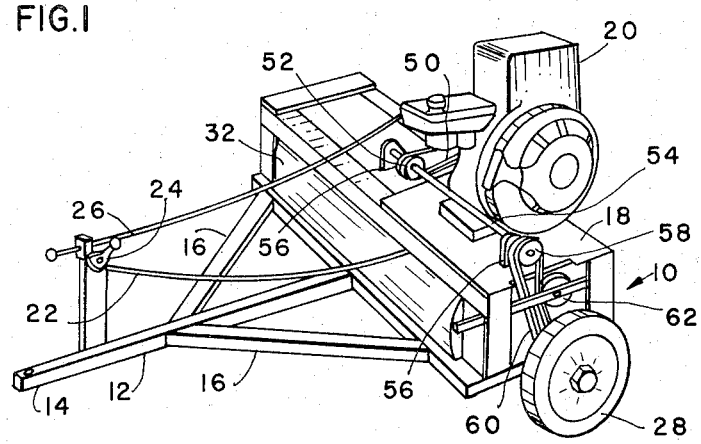
FIG. 1 is a perspective view of the invention.
Figure 2:
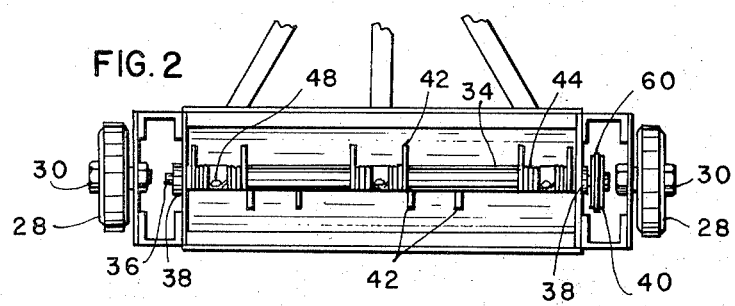
FIG. 2 is a bottom view looking into the rake shaft enclosure.

Referring now to the drawings wherein the invention is shown at 10, having a frame 12, said frame having tongue 14 for towing behind lawnmower or other suitable towing means.

Said frame having strengthening struts 16 and having additional framework to support platform 18, said platform providing a base for rake shaft drive means 20, in this instance said drive means being a gasoline engine. Drive means 20 also has a flexible control cable 22 for the engine throttle (not shown) and an actuating rotatable handle 24; and a flexible control cable 26 operable to actuate a drive engaging clutch (not shown). Wheels 28 provide mobility, and are removably attached to frame by bolt and nut means 30. Semi circular shroud 32, securely fastened within confines of that part of frame work comprising platform 18, restrains raked matter from going astray.

Figure 3:
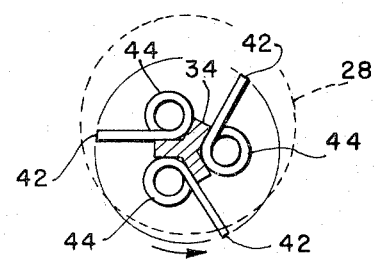
FIG. 3 is an enlarged sectional view through the main rake shaft.
Figure 4:
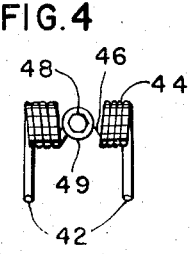
FIG. 4 is an enlarged view of one rake torsionally wound spring.

Main rake shaft 34, being trifurcated in section, has a diametral shaft 36 integrally affixed to each end, restrained within frame by collars 38, and has drive pulley 40 removably attached to one end, said shaft rotating in direction of arrow (FIG. 3.) Rake fingers 42, being the ends of a torsionally wound coil spring 44, said spring being separated midway, with a series of coils on either side of said separation, and spring wire forming loop 46 within said separation, said spring being fastened to the main rake shaft with a screw 48 passing through loop 46 with a washer 49, or other means similar type fastening. Said torsionally wound springs arranged on main rake shaft in such a manner, as to provide a substantially spiralling effect of rake fingers. Said ends of springs 44 referred to as fingers are sufficiently long, extending beyond diameter of wheel 28, to allow said fingers to agitate and loosen dead grass and other matter from lawns.

Drive to rake shaft is accomplished by belt 50 from clutch drive shaft (not shown), said belt rotating pulley 52, said pulley removably mounted to shaft 54, said shaft supported at 56, said supports being an integral part of platform 18.

Pulley 58, removably attached to end of shaft 54, having belt 60, said belt engaging pulley 40, said pulley removably attached to diametral end 36, of main rake shaft 34. Belt 60, having suitable tension means at 62.

I claim:

1. A powered lawn rake adapted to be towed behind a lawn mower, a tractor, and the like comprising:
   a substantially rectangular hollow box-like frame having a horizontal top surface, a vertical front surface, a vertical back surface, and opposed vertical end surfaces; said vertical surfaces defining an elongated open bottom
   a pair of transversely spaced apart ground-engaging supporting wheels disposed at opposite end surfaces of said frame and rotatably affixed thereto;
   a tongue member affixed to the central portion of said frame front surface at the bottom edge thereof and projecting outwardly and forwardly therefrom, the projecting free end of said tongue adapted to be connected to said towing means, and a pair of strut members extending diagonally between opposite end portions of said frame front surface and opposite sides of said tongue member to reinforce said tongue member;
   a shaft extending longitudinally through said frame and projecting outwardly of each of said end surfaces and being rotatably supported thereon for rotatable movement relative to said frame, said shaft having a trifurcated cross-sectional configuration defining three equal arm members each extending longitudinally between said end surfaces and projecting an equal distance radially from the axis of said shaft with each arm member being disposed an equal circumferal distance from each of the adjacent arm members such that a total of three arm members are provided;
   the opposite ends of said shaft where the same projects through said end surfaces are of a cylindrically shaped configuration adapted to pass through said end surfaces and be rotatably supported in bearing members provided therein;
   a pair of collar means, each collar means associated with one end of said shaft and adapted to fit over said cylindrical end portion and be secured thereto for detachably securing said shaft to said frame;
   powered means mounted on said frame;
   drive means interconnecting said powered means to said shaft to effect selective rotation of said shaft by said powered means;
   control means extending from said powered means to a position on said projecting free end of said tongue member to provide controlled operation of said powered means from a remote position at said front tongue end;
   a plurality of independent spring type raking members secured to positions on said shaft intermediate adjacent arm members in circumferally and longitudinally spaced apart relationship, said raking members being spaced circumferally the length of the shaft to define a spiral helical path about the circumference of the shaft between the opposite end portions thereof and intermediate said frame end surfaces; and means detachably securing said raking members to said shaft such that during rotation of said shaft said raking members have portions which extend through said open bottom toward the wheel supporting surface.

2. The powered lawn rake as set forth in claim 1 further characterized by said raking members each being of an identical size and configuration, with each of said raking members characterized by a unitarily integrally formed pair of longitudinally spaced apart parallel rake finger members each having a projecting free end, one of said finger members extending from said projecting free end and being bent into a coiled clockwise wound spring portion having an axis extending normal to said first finger member and terminating in an inner end portion, the second of said finger members likewise directed away from said projecting free end and being bent into a counter-clockwise spring coil having its axis in alignment with said first mentioned coil and extending normal to said second mentioned finger member and terminating in an inner end portion, said first and second inner end portions of said first and second coils being longitudinally spaced apart with the inner ends thereof being integrally formed into a loop shape defining a plane extending generally parallel to the plane of said pair of finger members, and wherein said means securing said raking members to said shaft comprises a plurality of bolt-like securing means, each bolt-like means associated with one of said raking members and adapted to engage and pass through said loop portion thereof to affix said raking member to said shaft in a position between adjacent shaft arm members with said finger members projecting outwardly from said shaft and being generally tangential to a side wall member of at least one of said arm members.

3. The powered lawn rake as set forth in claim 2 wherein each of said rake members are affixed to said shaft with the axis of said spring coils extending parallel to the axis of said shaft and with each of said finger members in resting resilient tensioned engagement with an associated side wall of an associated arm member for resilient pivotal movement of said finger members about axes parallel to said shaft axis, each of said finger members projecting outwardly from said shaft a sufficient distance to make raking contact with the ground upon rotative movement of said shaft relative to said frame, said shaft rotating in a direction to effect movement of said finger members in a direction away from said contacted arm member side wall in a manner tensioning said associated coil spring, said coil spring urging said finger member back into contact with said associated arm member side wall, said coil spring members tensionally retaining said associated finger members in contact with said associated arm member side wall which acts as a limiting stop for said finger member in one direction of pivotal movement about said coil axis.

4. The powered lawn rake as set forth in claim 3 wherein said power means comprises a gas powered engine, and wherein said drive means interconnecting said engine to said shaft comprises a cylindrical rod affixed to said frame top surface and extending longitudinally therealong parallel to the axis of said shaft, a pair of longitudinally spaced apart brackets affixed to said frame top surface and projecting upwardly therefrom and rotatably supporting opposite end portions of said rod, a pulley affixed concentrically on said rod adjacent one end thereof, a second pulley affixed to the opposite end of said rod concentrically thereon, a flexible drive belt drivingly interconnecting said first pulley to said gas engine, a third pulley affixed concentrically to a projecting end of said shaft, flexible drive belt means interconnecting said second pulley to said third pulley, belt tensioning means in operative engagement with said drive belt interconnecting said second and third pulleys and operable to maintain belt tension therein whereby upon actuation of said control means rotative power from said gas engine is transmitted to said first pulley which in turn drives said rod which in turn drives said second pulley which in turn drives said third pulley which in turn rotatably drives said shaft.

* * * * *